United States Patent
Lin et al.

(10) Patent No.: US 11,449,968 B2
(45) Date of Patent: Sep. 20, 2022

(54) SYSTEM AND METHOD FOR SYNTHETIC DEPTH-OF-FIELD EFFECT RENDERING FOR VIDEOS

(71) Applicant: Samsung Electronics Co., Ltd., Suwon-si (KR)

(72) Inventors: Kaimo Lin, Allen, TX (US); Chenchi Luo, Plano, TX (US); Yingmao Li, Allen, TX (US); Youngjun Yoo, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 24 days.

(21) Appl. No.: 17/139,894

(22) Filed: Dec. 31, 2020

(65) Prior Publication Data

US 2022/0207655 A1 Jun. 30, 2022

(51) Int. Cl.
*G06T 5/00* (2006.01)
*G06T 7/571* (2017.01)
*G06T 5/20* (2006.01)
*G06T 5/50* (2006.01)
(Continued)

(52) U.S. Cl.
CPC ............. *G06T 5/002* (2013.01); *G06T 3/40* (2013.01); *G06T 5/20* (2013.01); *G06T 5/50* (2013.01); *G06T 7/215* (2017.01); *G06T 7/571* (2017.01); *G06T 2207/10016* (2013.01);
(Continued)

(58) Field of Classification Search
CPC .. G06T 5/002; G06T 5/20; G06T 5/50; G06T 7/215; G06T 7/571; G06T 3/40; G06T 2207/10016
See application file for complete search history.

(56) References Cited

U.S. PATENT DOCUMENTS

| 7,912,319 B2 | 3/2011 | Lakshamanan et al. |
| 8,189,100 B2 | 5/2012 | Li et al. |
| 9,442,363 B2 | 9/2016 | Seo et al. |

(Continued)

FOREIGN PATENT DOCUMENTS

| WO | 2009/142332 A1 | 11/2009 |
| WO | 2020099893 A1 | 5/2020 |

OTHER PUBLICATIONS

Li et al., U.S. Appl. No. 16/703,712 entitled "Apparatus and Method for Dynamic Multi-Camera Rectification Using Depth Camera" filed Dec. 4, 2019, 50 pages.

(Continued)

*Primary Examiner* — Sean T Motsinger

(57) ABSTRACT

A method includes obtaining, using at least one processor of an electronic device, multiple video frames of a video stream and multiple depth frames corresponding to the multiple video frames. The method also includes generating, using the at least one processor, multiple blur kernel maps based on the multiple depth frames. The method further includes reducing, using the at least one processor, depth errors in each of the multiple blur kernel maps. The method also includes performing, using the at least one processor, temporal smoothing on the multiple blur kernel maps to suppress temporal artifacts between different ones of the multiple blur kernel maps. In addition, the method includes generating, using the at least one processor, blur effects in the video stream using the multiple blur kernel maps.

20 Claims, 11 Drawing Sheets

(51) Int. Cl.
*G06T 3/40* (2006.01)
*G06T 7/215* (2017.01)

(52) U.S. Cl.
CPC .............. *G06T 2207/10028* (2013.01); *G06T 2207/20028* (2013.01); *G06T 2207/20092* (2013.01)

(56) References Cited

U.S. PATENT DOCUMENTS

| | | | |
|---|---|---|---|
| 9,906,721 | B2 | 2/2018 | Evans, V et al. |
| 10,311,337 | B1 | 6/2019 | Kim et al. |
| 10,373,073 | B2 | 8/2019 | Kisilev |
| 10,992,845 | B1* | 4/2021 | Seely .................... H04N 5/2226 |
| 2015/0085083 | A1 | 3/2015 | Chen et al. |
| 2015/0178970 | A1 | 6/2015 | Pham |
| 2017/0200279 | A1 | 7/2017 | Zhong et al. |
| 2017/0366749 | A1 | 12/2017 | Zolotov |
| 2018/0139382 | A1 | 5/2018 | Venkataraman et al. |
| 2020/0042833 | A1 | 2/2020 | Toor et al. |
| 2020/0051265 | A1* | 2/2020 | Kim ......................... G06T 5/003 |
| 2020/0322544 | A1 | 10/2020 | Jung et al. |
| 2020/0358963 | A1 | 11/2020 | Manzari et al. |
| 2021/0073953 | A1* | 3/2021 | Lee ....................... G06N 3/0454 |
| 2021/0281813 | A1* | 9/2021 | Vyas ....................... H04N 13/128 |
| 2021/0407050 | A1* | 12/2021 | Seely ....................... G06T 5/002 |
| 2022/0012903 | A1* | 1/2022 | Vyas ......................... G06T 5/001 |
| 2022/0086360 | A1* | 3/2022 | Deng ....................... G01S 17/08 |

OTHER PUBLICATIONS

Kumar et al., "Feature Map Augmentation to Improve Rotation Invariance in Convolutional Neural Networks," Springer Nature Switzerland AG, 2020, pp. 348-359.

Luo et al., U.S. Appl. No. 16/946,989 entitled "Mobile Data Augmentation Engine for Personalized On-Device Deep Learning System" filed Jul. 14, 2020, 39 pages.

Luo et al., U.S. Appl. No. 17/106,676 entitled "System and Method for Generating Bokeh Image for DLSR Quality Depth-of-Field Rendering and Refinement and Training Method for the Same" filed Nov. 30, 2020, 41 pages.

International Search Report and Written Opinion of the International Searching Authority regarding International Patent Application No. PCT/KR2021/020146 dated Apr. 4, 2022, 10 pages.

* cited by examiner

SYSTEM AND METHOD FOR SYNTHETIC DEPTH-OF-FIELD EFFECT RENDERING FOR VIDEOS

TECHNICAL FIELD

This disclosure relates generally to image processing systems. More specifically, this disclosure relates to a system and method for synthetic depth-of-field effect rendering for videos.

BACKGROUND

Many mobile electronic devices, such as smart phones and tablet computers, include cameras that can be used to capture still and video images. While convenient, cameras on mobile electronic devices typically have short focal lengths and small aperture sizes, so pictures taken on a mobile electronic device are usually sharp. "Bokeh" refers to an effect that helps to improve the aesthetic quality of an image by blurring out-of-focus portions of the image (such as a background of the image) while keeping other portions of the image (such as a foreground or one or more subjects) in focus. For many mobile electronic devices, Bokeh is achieved computationally rather than optically. For example, a mobile electronic device may estimate various depths in a scene, and Bokeh images of the scene can be created computationally using the estimated depths.

SUMMARY

This disclosure provides a system and method for synthetic depth-of-field effect rendering for videos.

In a first embodiment, a method includes obtaining, using at least one processor of an electronic device, multiple video frames of a video stream and multiple depth frames corresponding to the multiple video frames. The method also includes generating, using the at least one processor, multiple blur kernel maps based on the multiple depth frames. The method further includes reducing, using the at least one processor, depth errors in each of the multiple blur kernel maps. The method also includes performing, using the at least one processor, temporal smoothing on the multiple blur kernel maps to suppress temporal artifacts between different ones of the multiple blur kernel maps. In addition, the method includes generating, using the at least one processor, blur effects in the video stream using the multiple blur kernel maps.

In a second embodiment, an electronic device includes at least one memory configured to store instructions. The electronic device also includes at least one processing device configured when executing the instructions to obtain multiple video frames of a video stream and multiple depth frames corresponding to the multiple video frames. The at least one processing device is also configured when executing the instructions to generate multiple blur kernel maps based on the multiple depth frames. The at least one processing device is further configured when executing the instructions to reduce depth errors in each of the multiple blur kernel maps. The at least one processing device is also configured when executing the instructions to perform temporal smoothing on the multiple blur kernel maps to suppress temporal artifacts between different ones of the multiple blur kernel maps. In addition, the at least one processing device is configured when executing the instructions to generate blur effects in the video stream using the multiple blur kernel maps.

In a third embodiment, a non-transitory machine-readable medium contains instructions that when executed cause at least one processor of an electronic device to obtain multiple video frames of a video stream and multiple depth frames corresponding to the multiple video frames. The medium also contains instructions that when executed cause the at least one processor to generate multiple blur kernel maps based on the multiple depth frames. The medium further contains instructions that when executed cause the at least one processor to reduce depth errors in each of the multiple blur kernel maps. The medium also contains instructions that when executed cause the at least one processor to perform temporal smoothing on the multiple blur kernel maps to suppress temporal artifacts between different ones of the multiple blur kernel maps. In addition, the medium contains instructions that when executed cause the at least one processor to generate blur effects in the video stream using the multiple blur kernel maps.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 12, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, "Bokeh" refers to an effect that helps to improve the aesthetic quality of an image by blurring out-of-focus portions of the image (such as a background of the image) while keeping other portions of the image (such as a foreground or one or more subjects) in focus. Due to lens and sensor size limitations, many devices can only simulate the Bokeh effect using stereo depth estimation and depth-of-field (DoF) rendering. In single image Bokeh simulation, accurate depth estimation is very important. The depth information can be estimated by various methods, such as multi-view stereo matching, use of one or more depth sensors, artificial intelligence (AI)-based depth estimation, and the like.

Although these techniques may be suitable for static images, most of these techniques are not adequate for video streams. For example, one technique uses object masks for Bokeh rendering. This technique blurs pixels outside the mask with a uniform size blur kernel, while pixels inside the mask remain the same. There are multiple drawbacks to this technique. For example, there is no blur transition in the image region with gradient depth (such as ground, z-direction walls, etc.). The technique cannot identify objects that share the same depth distance as the target object, so those objects at the same depth level but outside the mask are incorrectly blurred. Also, the technique cannot achieve special blurring effects, such as re-focusing.

This disclosure provides systems and methods for synthetic DoF effect rendering for videos. The disclosed embodiments generate visually plausible Bokeh effects in real time for mobile-captured or other captured videos when given pre-computed unstable and inconsistent depth inputs. The disclosed embodiments include a number of features, including an efficient spatial depth refinement technique that reduces depth errors around salient object boundaries, an adaptive temporal smoothing technique that suppresses flickering caused by unstable and inconsistent depth inputs, an efficient image blurring and blending technique that can generate smooth blur transitions between in-focus and out-of-focus layers, and a user-friendly interactive mechanism that supports special blurring effects (such as re-focusing). Compared with conventional Bokeh image generation techniques, the disclosed embodiments ensure good user experience for previewing high-quality video Bokeh results in real time and for higher quality rendering in an offline or gallery mode.

Figure 1:
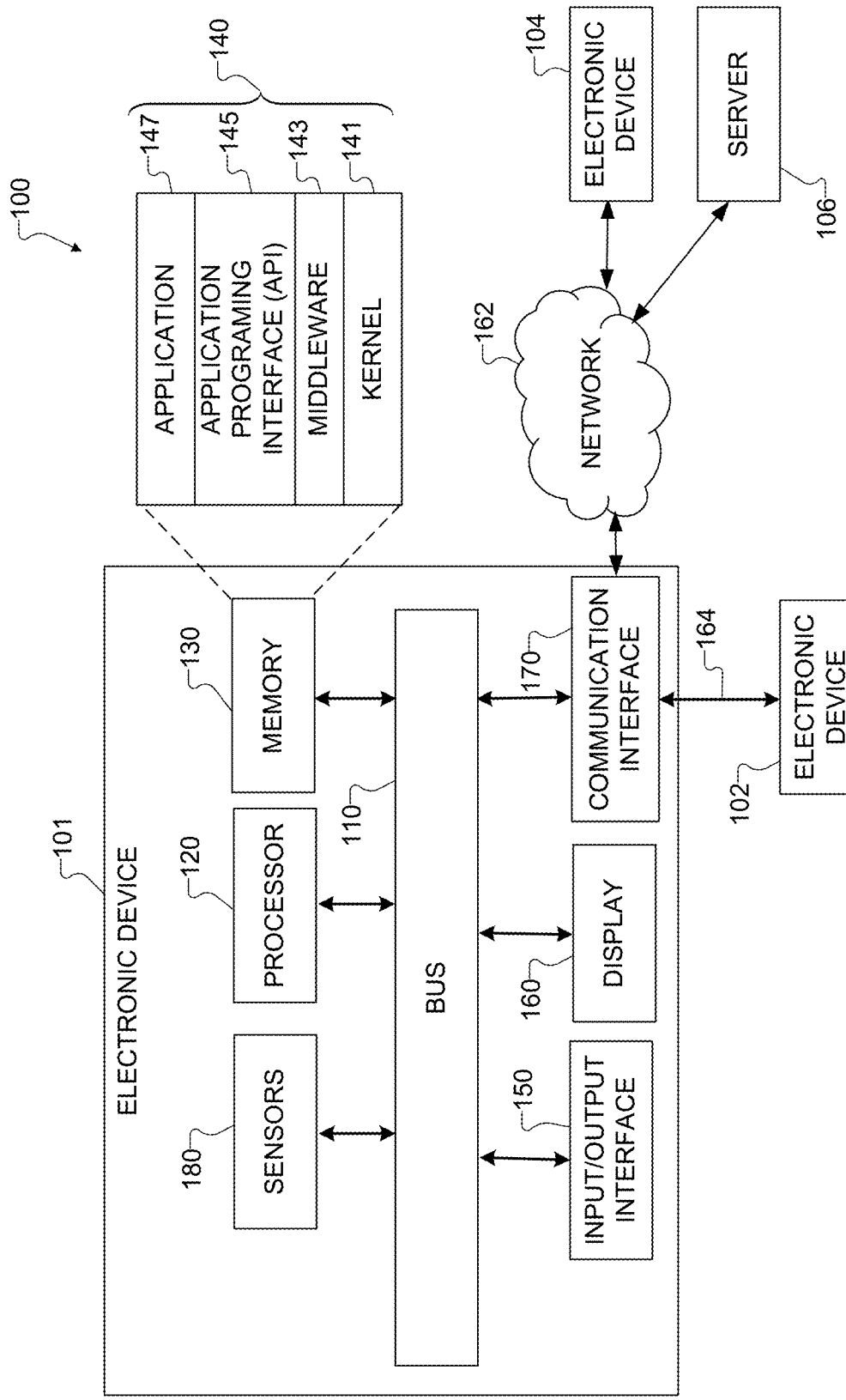
FIG. 1 illustrates an example network configuration including an electronic device according to this disclosure.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 can obtain multiple video frames of a video stream and multiple depth frames corresponding to the multiple video frames, generate multiple blur kernel maps based on the multiple depth frames, reduce depth errors in each of the multiple blur kernel maps, perform temporal smoothing on the multiple blur kernel maps to suppress temporal artifacts between different ones of the multiple blur kernel maps, and generate blur effects in the video stream using the multiple blur kernel maps.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for image capture and image processing as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images or videos.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 can obtain multiple video frames of a video stream and multiple depth frames corresponding to the multiple video frames, generate multiple blur kernel maps based on the multiple depth frames, reduce depth errors in each of the multiple blur kernel maps, perform temporal smoothing on the multiple blur kernel maps to suppress temporal artifacts between different ones of the multiple blur kernel maps, and generate blur effects in the video stream using the multiple blur kernel maps.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
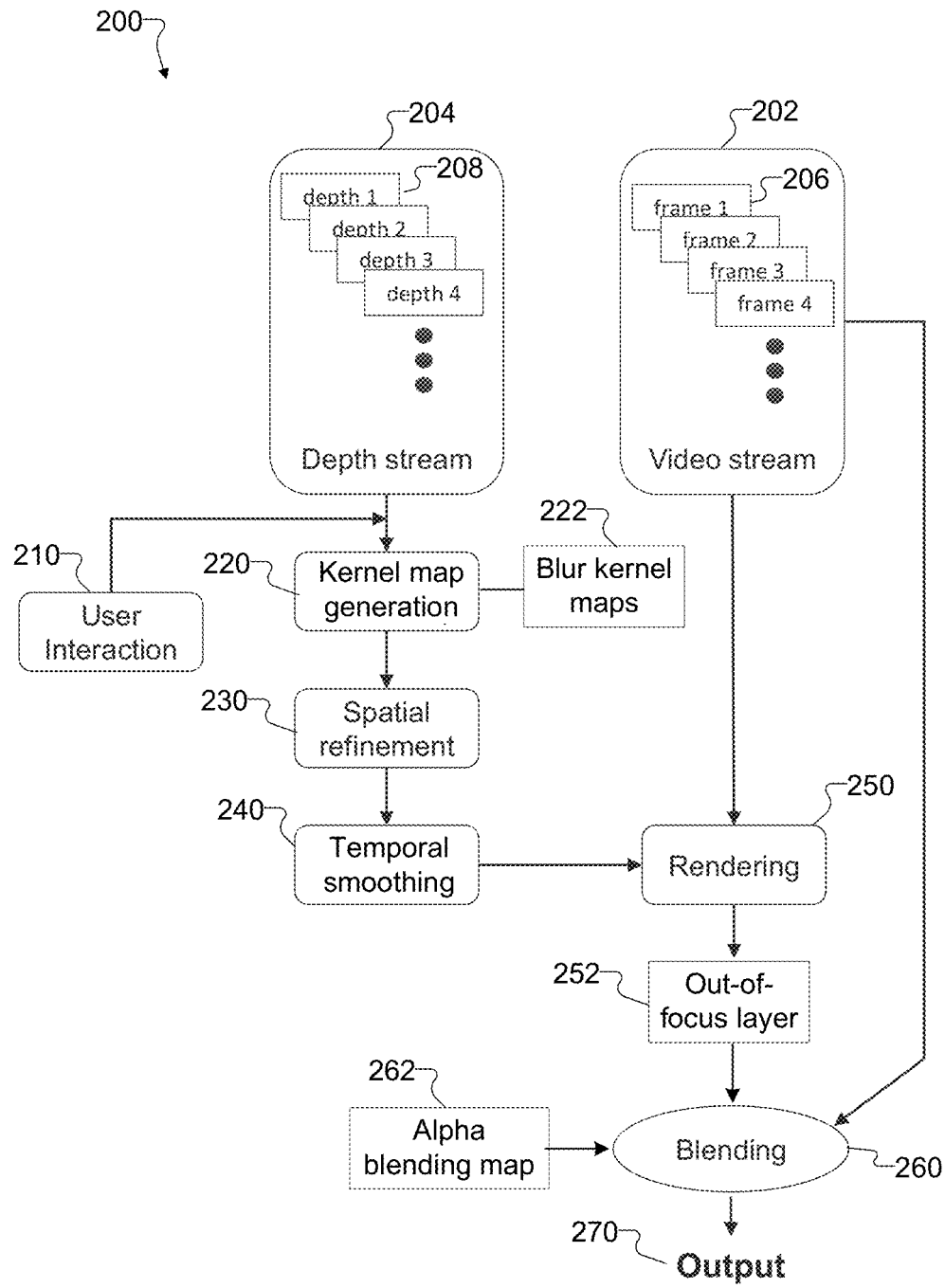
FIG. 2 illustrates an example process for synthesizing Bokeh effects in a video stream according to this disclosure.

FIG. 2 illustrates an example process 200 for synthesizing Bokeh effects in a video stream according to this disclosure. For ease of explanation, the process 200 is described as being implemented in the electronic device 101 shown in FIG. 1. However, the process 200 could be implemented in any other suitable electronic device and in any suitable system, such as by using the server 106 in FIG. 1.

As shown in FIG. 2, the electronic device 101 receives, generates, or otherwise obtains an input of a video stream 202 and a corresponding depth stream 204. The video stream 202 includes multiple video frames 206, and the depth stream 204 includes multiple depth maps 208 (where each video frame 206 has a one-to-one correspondence with one of the depth maps 208). In some embodiments, the electronic device 101 captures the video stream 202 in response to an event, such as a user actuating a video capture or shutter control. In particular embodiments, the electronic device 101 includes one or more RGB cameras or other imaging sensors 180 used to capture the video stream 202. Typically, the video stream 202 contains video frames 206 that are in focus, meaning there are generally few or no blurred areas within each video frame 206. The electronic device 101 can obtain the depth stream 204 using one or more depth sensors, an AI-based depth estimation technique, or any other suitable depth estimation system. It is assumed that the depth stream 204 is not perfect, so the depth stream 204 may have errors or temporal inconsistencies.

Figure 3:
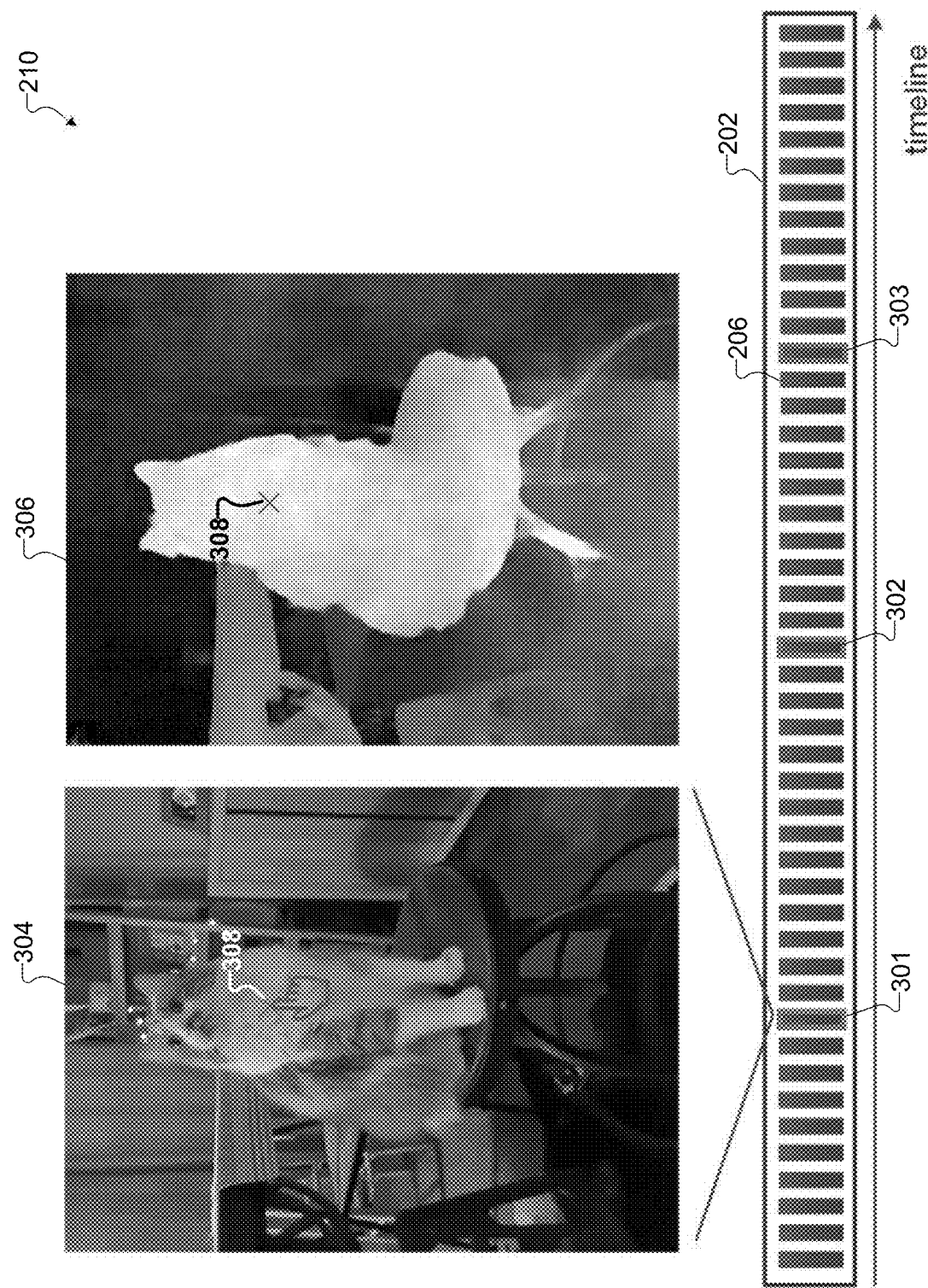
FIG. 3 illustrates additional details of a user interaction operation in the process of FIG. 2 according to this disclosure.

The electronic device 101 also performs a user interaction operation 210. In the user interaction operation 210, a user selects one or more key frames from among the video frames 206 in the video stream 202. For each selected key frame, the user also selects a focus object for the key frame. FIG. 3 illustrates additional details of the user interaction operation 210 according to this disclosure. As shown in FIG. 3, the video stream 202 includes the multiple video frames 206, which are arranged here in temporal order along a timeline.

During the user interaction operation 210, the user selects multiple key frames 301-303 from among the video frames 206 in the video stream 202. In some embodiments, the user selects the key frames 301-303 one at a time while playing the video stream 202 in a play mode of the electronic device 101, although key frames may be selected in any other suitable automated or manual manner. Also, in some embodiments, the user selects key frames 301-303 that are representative of key objects in the video stream 202, although key frames with other content may be selected here. Further, in some embodiments, the electronic device 101 can present a thumbnail region showing thumbnails of the video frames 206 for easier user selection of the key frames 301-303, although any other suitable mechanism may be used to select key frames. While FIG. 3 shows an embodiment in which the user selects three key frames 301-303, this is merely one example. In other embodiments, the user could select other numbers of key frames during the user interaction operation 210.

For each selected key frame 301-303, the user selects a focus object in the key frame 301-303. As shown in FIG. 3, the image 304 represents the selected key frame 301 as shown on the display 160 of the electronic device 101. In this example, the key frame 301 includes an image of a cat. For the key frame 301, the user selects a focus object 308. For example, the user can select the focus object 308 by touching the focus object 308 when the image 304 is displayed on the electronic device 101. Here, the focus object 308 is a part of the cat. The focus object 308 represents an area of the key frame 301 that will remain in focus, while other portions of the key frame 301 will be blurred to create the Bokeh effect. Note, however, that the focus object 308 may be selected in any other suitable automated or manual manner.

Once the focus object 308 is selected for each key frame 301-303, the electronic device 101 determines a distance $D_{focus}$ of the focus object 308. In some embodiments, the electronic device 101 can use the depth map 208 corresponding to the key frame 301-303 to determine the distance $D_{focus}$ of the focus object 208. For example, the image 306 represents a depth map 208 that corresponds to the key frame 301. In the image 306 of the depth map 208, lighter areas represent closer objects or pixels in the key frame 301, while darker areas represent objects or pixels that are more distant. For example, the focus object 308 may be only approximately 0.5 meters from the camera at the time of capture, while some background objects may be 4-5 meters or more from the camera. Of course, this is merely one example, and darker areas could represent closer objects and lighter areas could represent more distant objects. It is also noted that the focus distance of an object can change over the series of video frames 206. For example, the cat shown in the image 304 can move over time, or the camera capturing the video stream 202 can move relative to the cat. Thus, the distance $D_{focus}$ can be different for different key frames 301-303. In some cases, the electronic device 101 can perform interpolation or use another technique to determine the distance $D_{focus}$ for the video frames 206 between each of the key frames 301-303. The output is a distinct focus distance $D_{focus}$ for each video frame 206 in the video stream 202.

Once the focus distance is determined for each of the video frames 206, the electronic device 101 performs a kernel map generation operation 220 to generate blur kernel maps 222 as shown in FIG. 2. In the operation 220, the electronic device 101 generates a blur kernel map 222 from each raw depth map 208 in the depth stream 204. In some embodiments, the operation 220 uses a conversion algorithm that takes into account a depth-of-field (DoF) range based on the focus distance $D_{focus}$ for the corresponding video frame 206. However, this may generate possible errors in the blur kernel map 222 due to errors in the depth map 208.

Figure 4:
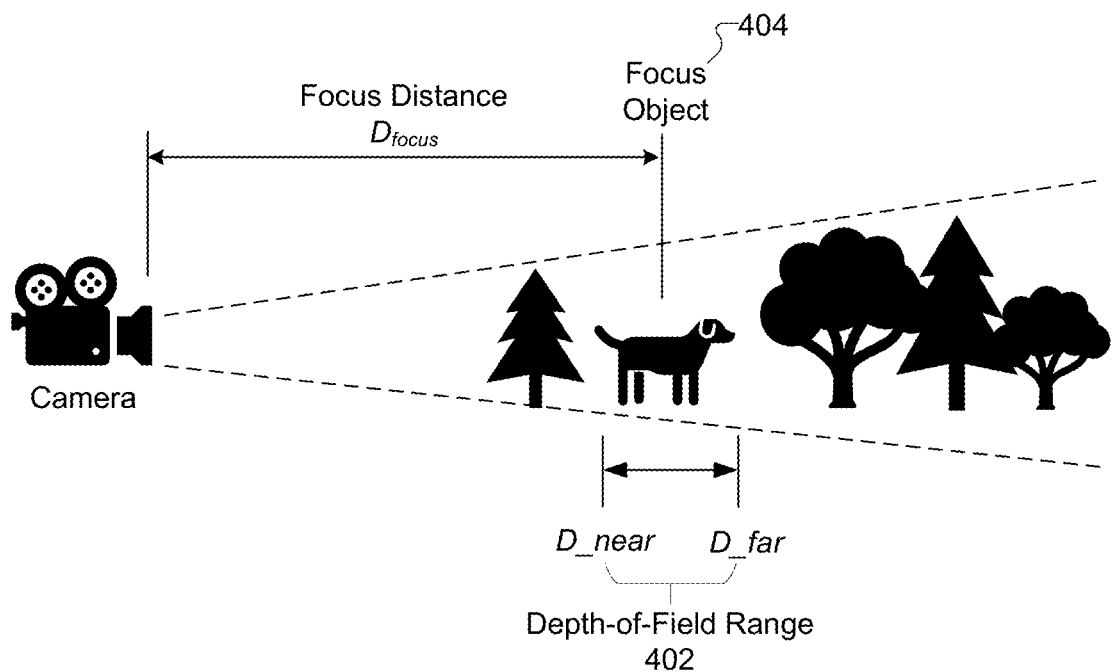
FIG. 4 illustrates an example of a depth-of-field (DoF) range according to this disclosure.

FIG. 4 illustrates an example of a DoF range 402 according to this disclosure. As shown in FIG. 4, a focus object 404 represents an object that may be selected by the user, such as the cat selected as the focus object 308 in FIG. 3. The focus distance $D_{focus}$ is the distance from the camera to the focus object 404. The DoF range 402 encompasses the focus object 404 such that the focus object 404 is within the DoF range 402. The DoF range 402 is bounded by distances D_near and D_far. In a video frame 206, objects that are in the DoF range 402 should be shown in focus, and it may be desirable to show at least some of the objects outside of the DoF range with blurring effects. As shown in FIG. 4, the DoF range 402 is relatively narrow compared to the range of depths of objects that appear in the image. The DoF range 402 can be selected by the user, predetermined by the electronic device 101, or identified in any other suitable manner. In some embodiments, when a default value for the DoF range 402 is predetermined, the DoF range 402 can be updated by the user.

Each blur kernel map 222 in FIG. 2 generated by the electronic device 101 can have a one-to-one pixel correspondence with the corresponding depth map 208. For example, the electronic device 101 can set the value of each pixel in the blur kernel map 222 to represent an amount of blur strength. In some embodiments, larger pixel values mean stronger blur strengths, although the opposite could also be true. Objects behind or in front of the focus object 308 can be blurred.

In some embodiments, the value of each pixel in the blur kernel map 222 indicates a kernel size that will be used for generating blur at that pixel. The size of the kernel for a given pixel affects the amount of blur that will be generated around that pixel. In some embodiments, objects that are within the DoF range 402 will receive no blur, and the electronic device 101 sets the value for those pixels to zero in the blur kernel map 222. Objects that are somewhat close to the focus object 308 but not within the DoF range 402 will receive smaller amounts of blur, and thus the electronic device 101 can set the values for those pixels to smaller values in the blur kernel map 222. In contrast, objects that are further away from the focus object 308 (which can be either closer to the camera or further away from the camera) will receive greater amounts of blur, and thus the electronic device 101 can set the values for those pixels to relatively larger values in the blur kernel map 222.

Figure 5:
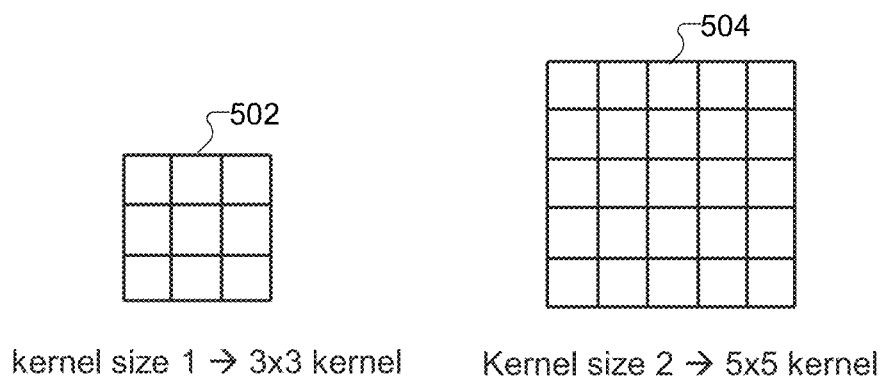
FIG. 5 illustrates examples of blur kernels and their corresponding kernel sizes according to this disclosure.

FIG. 5 illustrates examples of blur kernels and their corresponding kernel sizes according to this disclosure. For example, a blur kernel 502 is a 3×3 kernel and is designated by kernel size 1. A blur kernel 504 is a 5×5 kernel and is designated by kernel size 2. Additional or alternative kernel sizes can be used to designate additional or alternative sizes of blur kernels (such as kernel size 3: a 7×7 blur kernel, kernel size 4: a 9×9 blur kernel, kernel size 10: a 21×21 blur kernel, etc.). Larger blur kernels can result in greater amounts of blur. The electronic device 101 can set the values of the pixels in the blur kernel maps 222 to one of these kernel size values. Of course, other embodiments for defining the blur kernel maps 222 may also be used.

After the blur kernel maps 222 are generated, the electronic device 101 performs a spatial refinement operation 230 as shown in FIG. 2 to reduce depth errors in each blur kernel map 222. The depth errors are spatial errors that often occur at one or more locations in the corresponding video frame 206, such as at object boundaries where two objects at different depths meet in the video frame 206.

In an ideal case, spatial refinement would be applied at every pixel location in a blur kernel map 222, which might be done in some embodiments where adequate processing power is available. However, due to the number of pixels in each blur kernel map 222, this may not be very efficient for real-time applications. It is noted that depth errors usually happen at object motion boundaries (such as the silhouette of a moving object). In addition, artifacts are most noticeable at those motion boundary regions. Therefore, for improved efficiency and real-time performance, the electronic device 101 in other embodiments may only perform the spatial refinement operation 230 in those regions to refine the depth in those regions. The area of the motion boundary regions is typically only a small percentage (such as approximately 5%-10%) of the total area of the video frame. The remaining areas (such as 90%-95%) can be ignored when performing the spatial refinement operation 230.

The spatial refinement operation 230 can include an edge-aware spatial filtering of each blur kernel map 222 to reduce depth errors in the blur kernel map 222. In some embodiments, the spatial refinement operation 230 includes the following steps. For each blur kernel map 222 corresponding to frame "t" (where frame "t" is one of the video frames 206), the electronic device 101 computes a motion boundary mask in order to identify the motion boundary region. The electronic device 101 then applies a bilateral filter on the blur kernel map 222 corresponding to frame "t," but only on the region(s) defined by the motion boundary mask.

Figure 6:
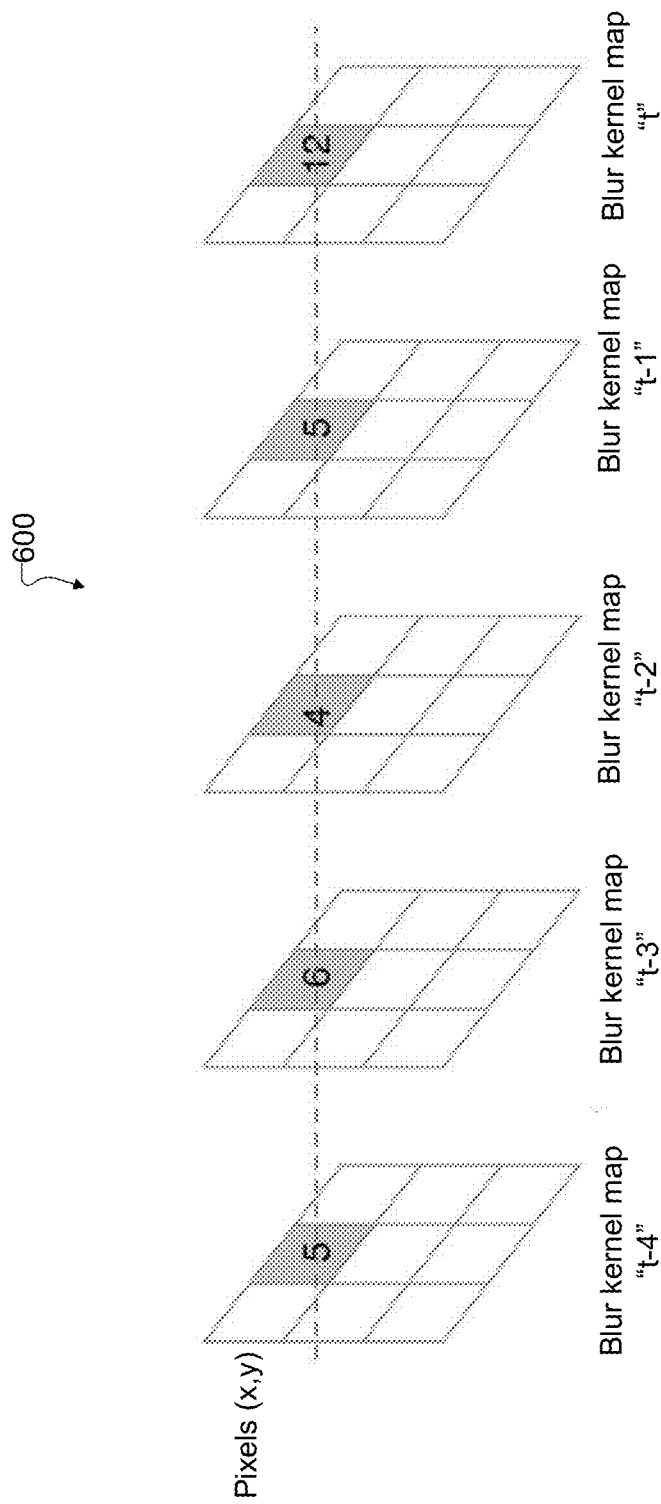
FIG. 6 illustrates an example process for identifying a motion boundary region for use in a spatial refinement operation in the process of FIG. 2 according to this disclosure.

FIG. 6 illustrates an example process 600 for identifying a motion boundary region for use in the spatial refinement operation 230 according to this disclosure. As shown in FIG. 6, to identify motion boundary regions for each frame "t," the electronic device 101 analyzes depth information at each pixel location using blur kernel maps 222 of "history frames," which are video frames 206 that occur before the frame "t" in temporal order. For example, the blur kernel map "t" is the blur kernel map 222 corresponding to the frame "t." The blur kernel map "t−1" is the blur kernel map corresponding to the frame "t−1," which is the video frame 206 immediately prior to the frame "t." Similarly, the blur kernel maps "t−2," "t−3," and "t−4" correspond to earlier video frames 206.

In a region of a video scene without movement, it is expected that pixels of the depth map and blur kernel map in that region will remain essentially constant over a period of time. However, if the depth information at a pixel location (x, y) changes suddenly in the one or more latest frames, the pixel can be marked as a motion boundary pixel. In some embodiments, the electronic device 101 can check every pixel in the blur kernel map "t" and collect those motion boundary pixels to form the motion boundary regions. The electronic device 101 then generates a motion boundary mask M to represent the motion boundary regions.

In FIG. 6, the electronic device 101 can perform the following process to identify a motion boundary pixel in the blur kernel map "t" in order to construct the motion boundary mask M. For each pixel location (x, y) of the blur kernel map "t," the electronic device 101 performs the following. The electronic device 101 obtains the kernel values at (x, y) in a sequence of blur kernel maps, such as "t−4," "t−3," "t−2," "t−1," "t." For the shaded pixels in FIG. 6, the sequence of kernel values is [5, 6, 4, 5, 12]. While the initial sequence of values [5, 6, 4, 5] is relatively steady (with insignificant changes), the sudden large change to 12 in the next frame is significant, and there is a high likelihood that this pixel is part of a motion boundary. The electronic device 101 next applies a filtering operation (such as by using 1D-Gaussian filtering or another suitable filtering technique) at the end of the sequence [5, 6, 4, 5, 12] to obtain a filtered value at blur kernel map "t", such as 7. The electronic device 101 then compares the filtered value '7' with its original value '12.' If the difference is larger than a pre-defined threshold, the pixel (x, y) at blur kernel map "t" is considered to be a motion boundary pixel (a pixel with sudden depth change) that is part of the motion boundary region. The electronic device 101 adds this motion boundary pixel to the motion boundary mask M. In some embodiments, the motion boundary mask M is a binary mask, and the electronic device 101 can set the values of the pixels in the motion boundary mask 702 to '0' or '1,' where '0' represents a motion boundary pixel and '1' represents a non-motion boundary pixel (or vice versa).

Figure 7:
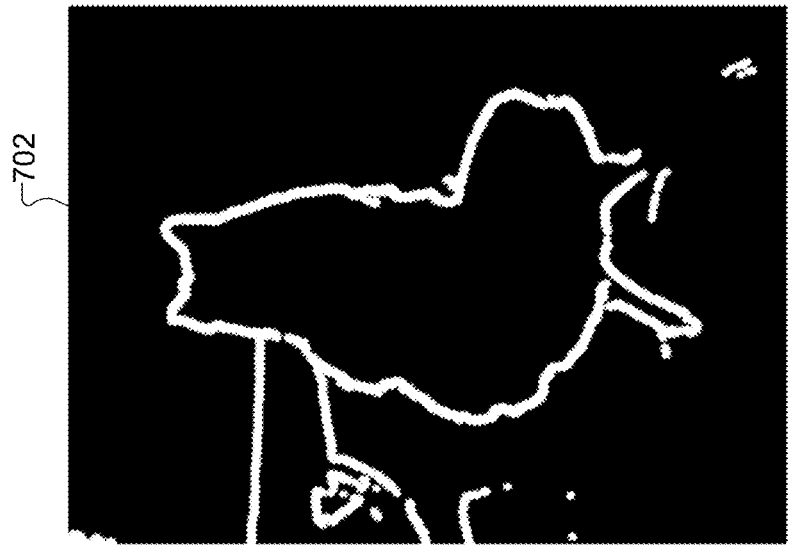
FIG. 7 illustrates an example of a motion boundary mask according to this disclosure.
Figure 7:

FIG. 7 illustrates an example of a motion boundary mask 702 according to this disclosure. The motion boundary mask 702 is a visual representation of the motion boundary mask M that is derived from the video frame 206 corresponding to the image 304. As shown in FIG. 7, the motion boundary mask 702 includes motion boundary pixels (represented by light regions) and non-motion boundary pixels (represented by dark regions).

As described above, the electronic device 101 can examine every pixel location (x, y) of a blur kernel map 222 to generate the motion boundary mask M. Of course, the process of examining every pixel of a blur kernel map 222 to construct the motion boundary mask M may not be very efficient for real-time applications. Thus, in some embodiments, the following process can be performed for an improvement in efficiency. The following process further reduces the number of computations while maintain good accuracy. It is noted that an object motion boundary is typically also a depth discontinuity boundary. For example, a boundary between a moving object and a non-moving object is typically also a boundary between two depths, since the moving object is at a different depth than the non-moving object. Therefore, to improve efficiency, the electronic device 101 can first compute a depth discontinuity mask $M_1$ and then compute the motion boundary mask M as a subset of the depth discontinuity mask $M_1$.

Note that each blur kernel map 222 is generated from the corresponding depth map 208, so the blur kernel map 222 reflects the relative depth information of the scene. Large kernel value differences between nearby pixels in the blur kernel map 222 also typically indicate a large depth difference. Thus, the intensity discontinuity regions in the blur kernel map 222 also represents the depth discontinuity regions of the scene. In order to find the intensity discontinuity regions in the blur kernel map 222, the electronic device 101 determines gradients across the blur kernel map 222. Pixel regions within the blur kernel map 222 that exhibit large gradient values correspond to large kernel size differences in the local region, meaning discontinuity regions. To convert the gradients into a binary depth discontinuity mask, the electronic device 101 performs a binary thresholding operation on the gradients followed by a dilation operation. The depth discontinuity mask is denoted as $M_1$.

Figure 8:
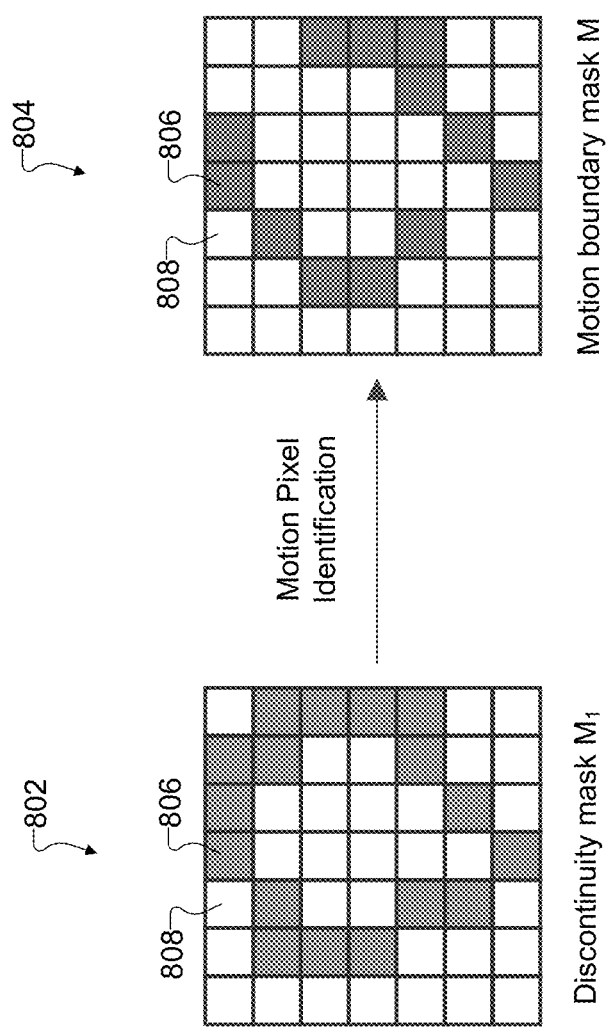
FIG. 8 illustrates simplified examples of a depth discontinuity mask and a corresponding motion boundary mask for a video frame according to this disclosure.

FIG. 8 illustrates simplified examples of a depth discontinuity mask $M_1$ 802 and a corresponding motion boundary mask M 804 for a video frame according to this disclosure. In FIG. 8, the squares of the depth discontinuity mask $M_1$ 802 and the motion boundary mask M 804 correspond to pixels in the video frame. The shaded pixels 806 are pixels that are part of the depth discontinuity regions or motion boundary regions, while the unshaded pixels 808 are not part of the depth discontinuity regions or motion boundary regions and can be ignored. Once the electronic device 101 generates the depth discontinuity mask $M_1$ for the frame "t", the electronic device 101 only needs to perform the identification of the motion boundary pixels (as discussed above) inside the depth discontinuity mask $M_1$ (only the shaded pixels 806) instead of within the entire frame, to construct the motion boundary mask M. For example, as shown in FIG. 8, the shaded pixels 806 of the motion boundary mask M 804 are a subset of the depth discontinuity mask $M_1$ 802. The depth discontinuity regions identified by the mask $M_1$ (the shaded pixels 806) usually include less than 5% of the video frame size, which means that the electronic device 101 can often eliminate more than 95% computation time to generate the motion boundary mask M compared to examining every image pixel. This efficiency further enables real-time performance. However, it should be noted that other embodiments may still examine every image pixel.

Figure 9:
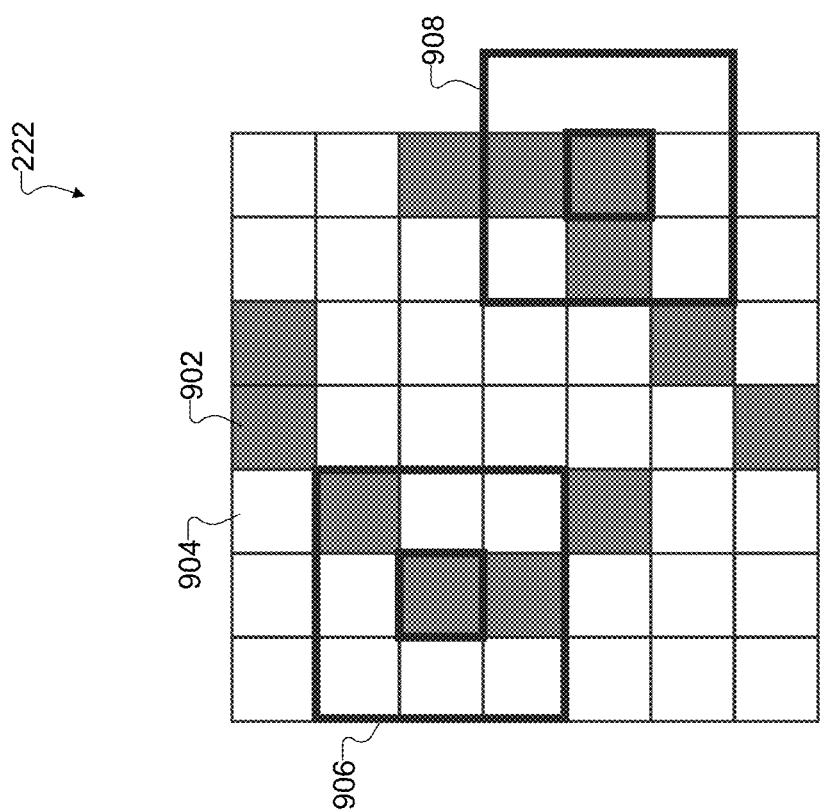
FIG. 9 illustrates a simplified example of a blur kernel map overlaid with a motion boundary mask according to this disclosure.

Once the electronic device 101 has obtained the motion boundary mask M for the frame "t," the electronic device 101 may apply a bilateral filter on the blur kernel map 222 corresponding to frame "t" to reduce depth errors. However, the electronic device 101 may apply the bilateral filter only on the regions defined by the motion boundary mask M. For example, FIG. 9 illustrates a simplified example of a blur kernel map 222 overlaid with the motion boundary mask M according to this disclosure. In FIG. 9, the shaded pixels 902 are pixels that are part of the motion boundary regions, while the unshaded pixels 904 are not part of the motion boundary regions. The electronic device 101 applies bilateral filtering on the blur kernel map 222 only inside the motion boundary mask M (only the shaded pixels 902). Bilateral filtering is a known technique for local depth refinement. For example, bilateral filters 906 and 908 are 3×3 filters that are applied on two of the shaded pixels 902.

In addition to performing the spatial refinement operation 230 to reduce depth errors in each blur kernel map 222, the electronic device 101 also performs a temporal smoothing operation 240 as shown in FIG. 2 to ensure temporal smoothness of the blurring effect. Unlike spatial refinement only for one frame representing a fixed moment in time, temporal smoothing is performed to suppress temporal artifacts caused by remaining depth errors due to differences in images over time in a video stream.

In an ideal case, temporal smoothing would include performing, for each pixel, pixel trajectory tracking between video frames (tracking the movement of a pixel over time due to movement of an object or a camera, which is sometimes referred to as optical flow estimation) and applying the temporal smoothing for each pixel trajectory. However, pixel trajectory tracking can be very time-consuming since it requires per-pixel trajectory tracking between multiple neighboring frames, which may not be very efficient for real-time applications. In some embodiments where processing power and time are adequate, this can be done. In other embodiments, for improved efficiency and real-time performance, the electronic device 101 can perform the temporal smoothing operation 240 at fixed locations for each pixel.

Figure 10:
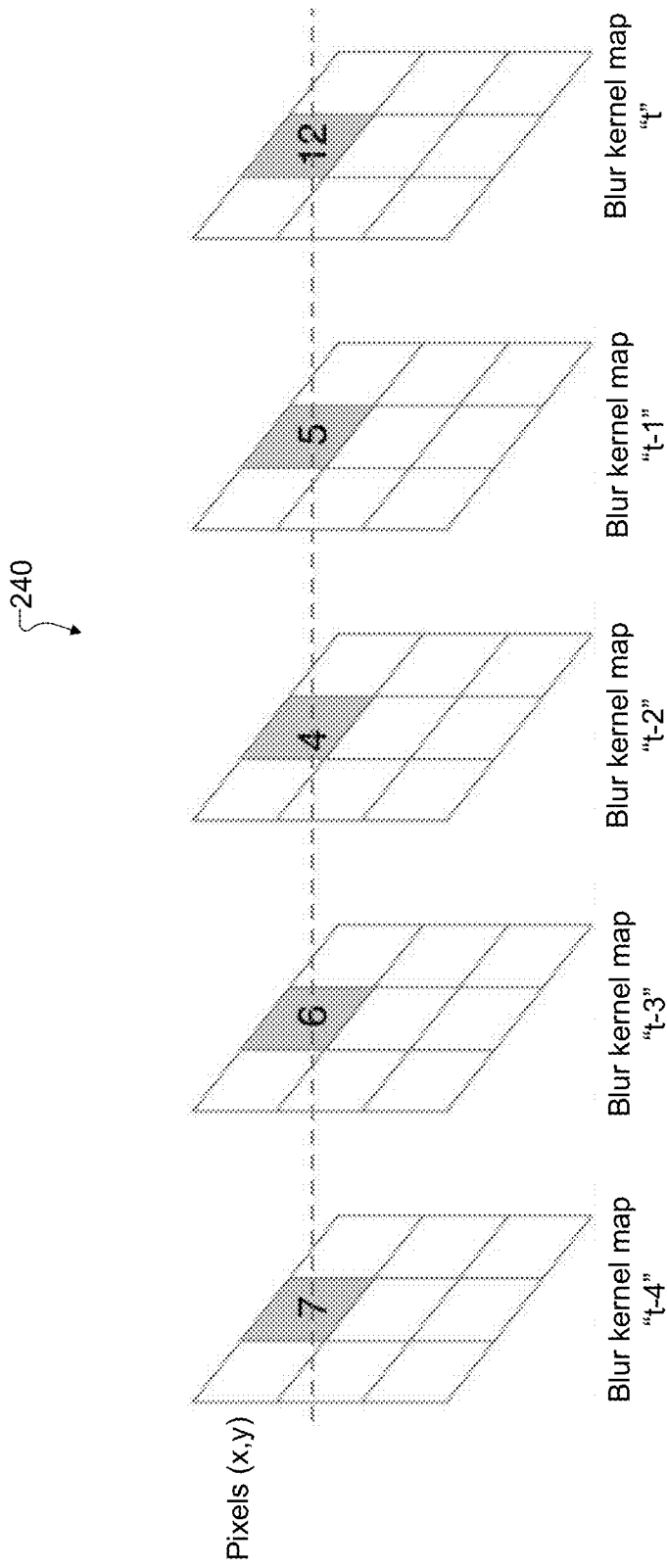
FIG. 10 illustrates an example of a temporal smoothing operation in the process of FIG. 2 according to this disclosure.

FIG. 10 illustrates an example of the temporal smoothing operation 240 according to this disclosure. As shown in FIG. 10, the electronic device 101 skips per-pixel trajectory tracking and performs temporal smoothing at a fixed location for each pixel of the blur kernel maps 222 of multiple history frames. For example, the blur kernel map "t" is the blur kernel map 222 corresponding to the frame "t." The blur kernel map "t−1" is the blur kernel map corresponding to the frame "t−1," which is the video frame 206 immediately prior to the frame "t." Similarly, the blur kernel maps "t−2," "t−3," and "t−4" correspond to earlier video frames 206. Although this technique does not include pixel trajectory tracking across frames, this technique can achieve similar smoothing results with minimum artifacts.

To process the current frame "t", the electronic device 101 may examine every pixel location (x, y) of the blur kernel map "t." For each pixel location (x, y) of the blur kernel map "t," the electronic device 101 performs the following. The electronic device 101 obtains the kernel values at the same location (x, y) in a sequence of blur kernel maps, such as "t−4," "t−3," "t−2," "t−1," "t." For the shaded pixels in FIG. 10, the sequence of kernel values is [7, 6, 4, 5, 12]. The electronic device 101 then applies a low-pass filtering operation (such as using 1D-Gaussian filtering or another suitable filtering technique) at the end of the sequence [7, 6, 4, 5, 12] to obtain a filtered value for blur kernel map "t" at pixel location (x, y), such as '9'. The electronic device 101 replaces the original value '12' with the filtered value '9' to promote temporal smoothness in frame "t." After the electronic device 101 performs this process for all pixel locations of the blur kernel map "t", the entire blur kernel map is smoothed.

In some embodiments, to further reduce computations and improve real-time efficiency, the electronic device 101 can perform the temporal smoothing operation 240 only on the frame's motion boundary regions instead of for all pixel locations. For example, turning again to FIG. 8, the electronic device 101 can perform the temporal smoothing operation 240 only on the shaded pixels 806 (which represent the motion boundary regions) of the motion boundary mask M 804. This is due to the observation that temporal artifacts are typically most noticeable in motion boundary regions.

After the electronic device 101 performs the temporal smoothing operation 240 to smooth the blur kernel map 222, the electronic device 101 performs a rendering operation 250 as shown in FIG. 2 to generate an out-of-focus (blurred) layer 252. To perform the rendering operation 250, the electronic device 101 obtains the all-clear video frames 206 of the video stream 202 and the corresponding blur kernel maps 222.

Typically, the blur kernel maps 222 and the video frames 206 are at different resolutions. For example, the video frames 206 can be at a 1080p high-definition (HD) or 4K HD resolution, while the blur kernel maps 222 can be at a lower resolution. However, it is easier to perform the rendering operation 250 when the inputs are at the same resolution. Thus, the electronic device 101 can determine a working scale $S_{work}$ to resize at least some of the input data to a working resolution for the rendering operation 250. In some embodiments, the working resolution is comparatively low (such as 320p or 576×324 pixels) so that the electronic device 101 can perform the rendering operation 250 quickly. For example, the electronic device 101 can scale at least some of the input data (the blur kernel map 222, the video frames 206, or both), such as by the following equation:

Input Data at working resolution=$(W_{input}*S_{work}, H_{input}*S_{work})$.

Note, however, that any other suitable working scale may be used here.

The electronic device 101 also determines a kernel size scale $S_{kernel}$ (which is used to control the blur strength), computes the maximum kernel size, and pre-computes a blur kernel list according to the maximum kernel size. Once the input data is all at the same working resolution, the electronic device 101 assigns a different blur kernel (such as a 3×3 blur kernel, a 5×5 blur kernel, etc.) at each pixel location based on the pixel values in the blur kernel map 222 and performs gathering at each pixel location to generate the blur effect as is known in the art. The result is an out-of-focus layer 252 that exhibits spatially-varying blur (the amount of blur varies across the out-of-focus layer 252).

After the electronic device 101 performs the rendering operation 250 to generate the out-of-focus layer 252, the electronic device 101 performs a blending operation 260 as shown in FIG. 2 to generate an output 270. The output 270 here represents the video stream 202 with synthesized blurred (Bokeh) effects.

In the blending operation 260, the electronic device 101 upsamples the lower-resolution (such as 320p resolution) out-of-focus layer 252 to the higher resolution of the video frames 206 of the video stream 202. However, upsampling the out-of-focus layer 252 can have the effect of causing some of the blur smoothness to be lost. That is, the upsampled out-of-focus layer 252 can have more abrupt changes in blur from one region to another. If the upsampled out-of-focus layer 252 were simply overlapped with the in-focus video stream 202 (which is sometimes referred to as the focus layer), there would be areas of unnatural-looking blur transition (such as abrupt, coarse blur transitions) around layer boundaries. To recover the lost blur smoothness, the electronic device 101 can use an alpha blending map 262.

The alpha blending map 262 may be generated from a higher-resolution (such as 1080p) blur kernel map 222. As discussed above, the blur kernel map 222 may be originally generated in a lower resolution (such as 320p), which may be the same resolution as the input depth map 208. However, the precision of the depth map 208 is at a sub-pixel level. That is, the disparity values in the depth map 208 are floating point values, so a quantized blur kernel map 222 can be upsampled to 1080p and still be very smooth. For example, a 0.1 pixel disparity value in the depth map 208 is sufficiently precise to achieve 1 pixel blur at 1080p resolution.

Figure 11:
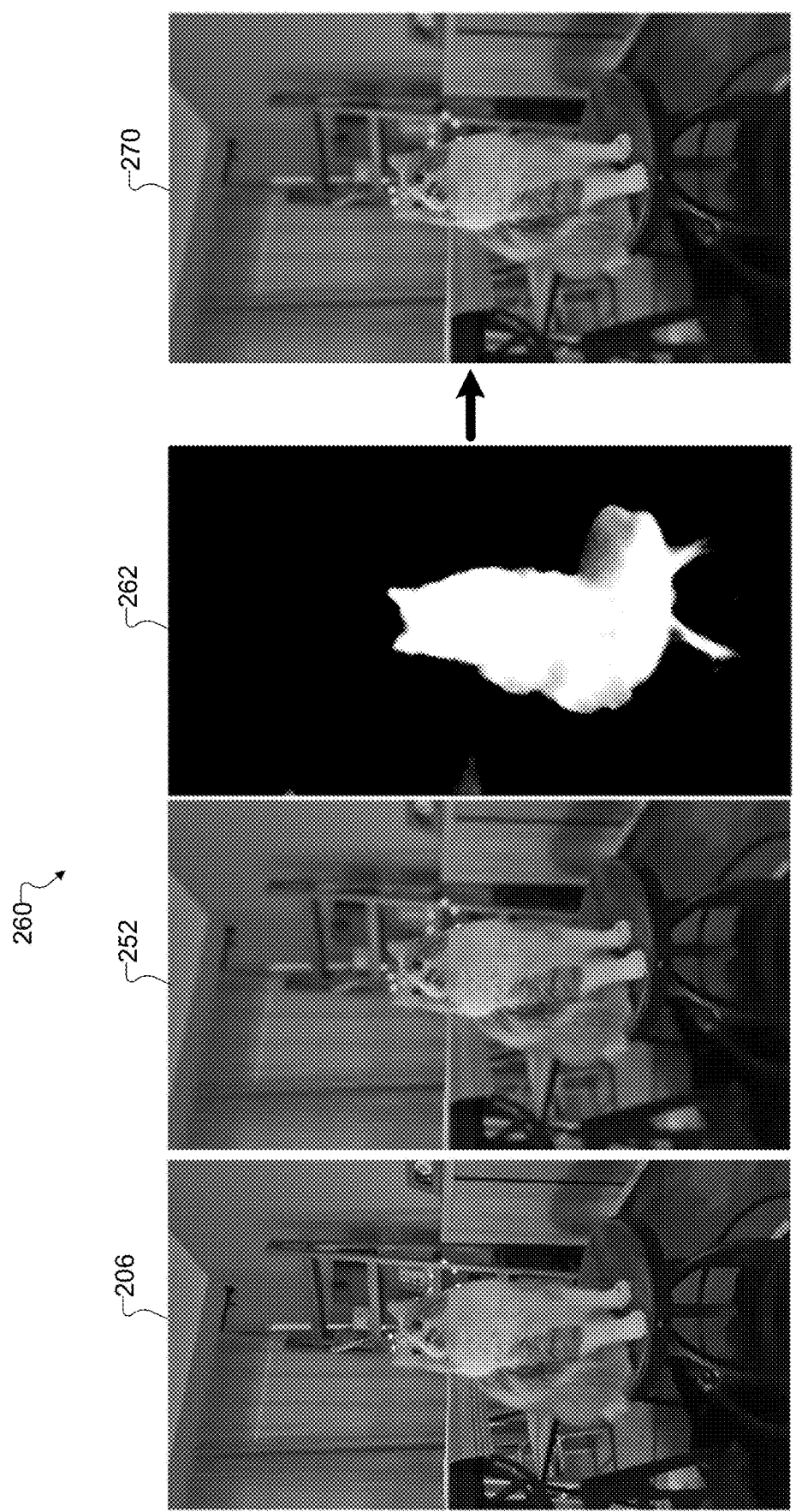
FIG. 11 illustrates additional details of a blending operation in the process of FIG. 2 according to this disclosure.

FIG. 11 illustrates additional details of the blending operation 260 according to this disclosure. As shown in FIG. 11, the electronic device 101 performs alpha blending on the video frame 206 using the out-of-focus layer 252 and the alpha blending map 262. In alpha blending, the electronic device 101 uses the alpha blending map 262 to simulate the missing blur transition in the upsampled out-of-focus layer 252. In some embodiments, the alpha blending is performed per pixel using the following algorithm:

RGB=α×focus-layer+(1−α)×out-of-focus-layer where RGB represents a pixel in the output 270, α represents the corresponding pixel in the alpha blending map 262, focus-layer represents the corresponding pixel in the input video frame 206, and out-of-focus-layer represents the corresponding pixel in the out-of-focus layer 252.

The result of the alpha blending is the output 270, which is shown in FIG. 11 as a video frame 206 with varying levels of blur in background regions. As shown in FIG. 11, the blur regions of the output 270 do not exhibit unnatural, abrupt changes in focus. The output 270 can be stored in a memory of the electronic device 101, displayed on a display of the electronic device 101, otherwise made available for a video application (such as a gallery application), or used in any other suitable manner.

It should be noted that the operations and functions shown in FIGS. 2 through 11 can be implemented in an electronic device 101 in any suitable manner. For example, in some embodiments, the operations shown in FIGS. 2 through 11 can be implemented or supported using one or more software applications or other software instructions that are executed by the processor 120 of the electronic device 101. In other embodiments, at least some of the operations shown in FIGS. 2 through 11 can be implemented or supported using dedicated hardware components. In general, the operations shown in FIGS. 2 through 11 can be performed using any suitable hardware or any suitable combination of hardware and software/firmware instructions.

Although FIGS. 2 through 11 illustrate example details of a process 200 for synthesizing Bokeh effects in a video stream and related details, various changes may be made to FIGS. 2 through 11. For example, while shown as a specific sequence of operations, various operations shown in FIGS. 2 through 11 could overlap, occur in parallel, occur in a different order, or occur any number of times (including zero times). Also, the specific operations shown in FIGS. 2 through 11 are examples only, and other techniques could be used to perform each of the operations shown in FIGS. 2 through 11. In addition, specific values (such as specific resolutions) discussed above can easily vary depending on a number of factors.

Figure 12:
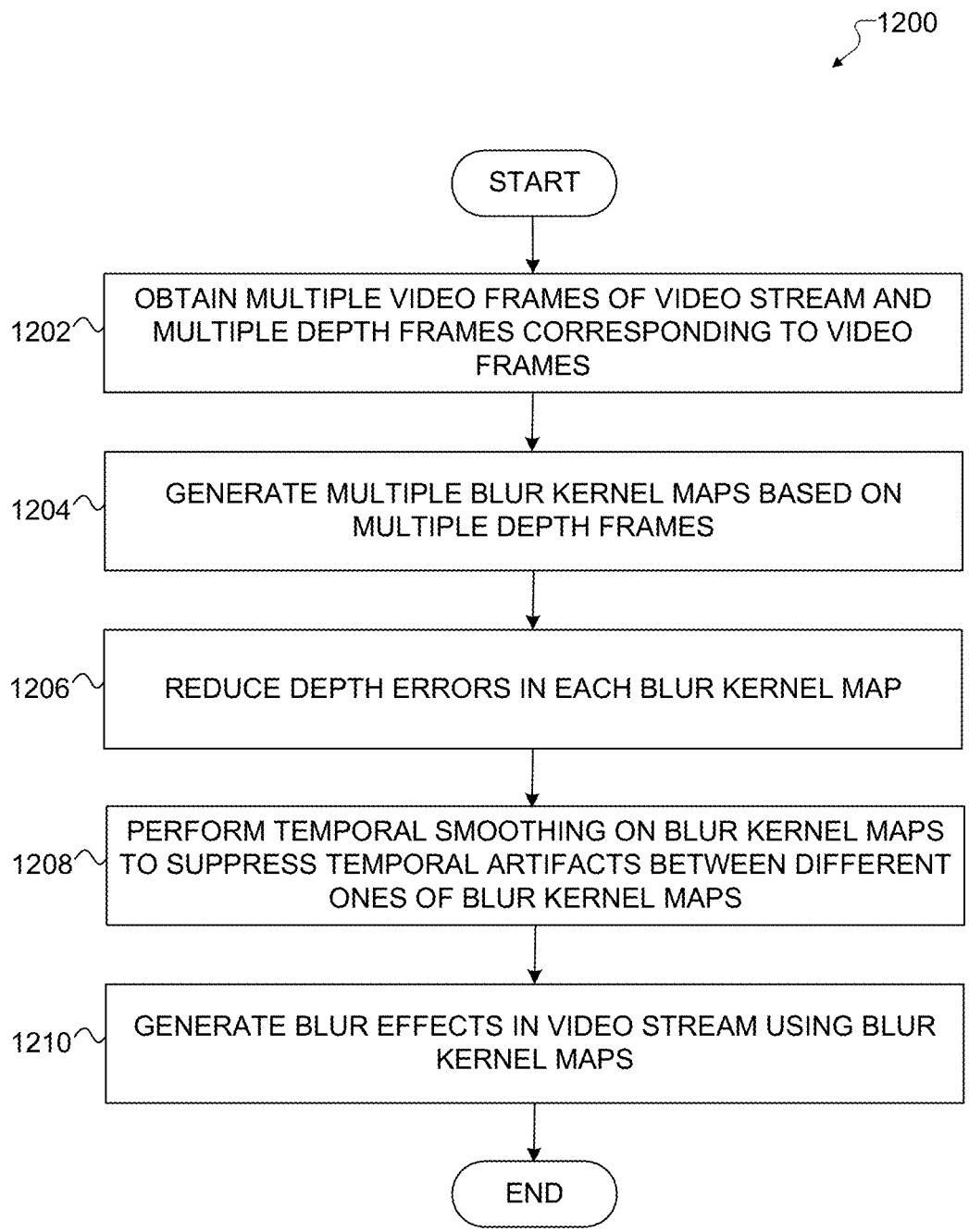
FIG. 12 illustrates an example method for synthesizing Bokeh effects in a video stream according to this disclosure.

FIG. 12 illustrates an example method 1200 for synthesizing Bokeh effects in a video stream according to this disclosure. For ease of explanation, the method 1200 shown in FIG. 12 is described as involving the use of the process 200 shown in FIGS. 2 through 11 with the electronic device 101 shown in FIG. 1. However, the method 1200 shown in FIG. 12 could be used with any other suitable electronic device and in any suitable system, such as with the server 106 in FIG. 1.

As shown in FIG. 12, an electronic device obtains multiple video frames of a video stream and multiple depth frames corresponding to the multiple video frames at step 1202. This could include, for example, the electronic device 101 obtaining the video frames 206 of the video stream 202 and the depth frames 208 of the depth stream 204. The electronic device generates multiple blur kernel maps based on the multiple depth frames at step 1204. This could include, for example, the electronic device 101 determining multiple key frames 301-303 among the video frames 206 (possibly based on user input), determining focus distances $D_{focus}$ for the video frames 206 based on the focus distance of each key frame 301-303, and generating blur kernel maps 222 using the depth frames 208 and the focus distances.

The electronic device reduces depth errors in each of the multiple blur kernel maps at step 1206. This could include, for example, the electronic device 101 determining a motion boundary mask M for each blur kernel map 222 and applying a bilateral filter on one or more regions of the blur kernel map 222 defined by the motion boundary mask. The electronic device performs temporal smoothing on the multiple blur kernel maps to suppress temporal artifacts between different ones of the multiple blur kernel maps at step 1208. This could include, for example, the electronic device 101 obtaining kernel values for multiple pixels across each blur kernel map 222 and corresponding pixels across multiple previous blur kernel maps 222 in a sequence, determining a filtered value for at least some of the kernel values using low-pass filtering, and replacing the at least some kernel values with the filtered values.

The electronic device generates blur effects in the video stream using the multiple blur kernel maps at step 1210. This could include, for example, the electronic device 101 generating an out-of-focus layer 252 for each video frame 206 using a corresponding one of the blur kernel maps 222, upsampling the out-of-focus layer 252 to a resolution of the video frame 206, and performing an alpha blending operation on the video frame 206 using the out-of-focus layer 252 and an alpha blending map 262. The resulting output 270 may be stored, displayed, transmitted, or used in any other suitable manner.

Although FIG. 12 illustrates one example of a method 1200 for synthesizing Bokeh effects in a video stream, various changes may be made to FIG. 12. For example, while shown as a series of steps, various steps in FIG. 12 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
    obtaining, using at least one processor of an electronic device, multiple video frames of a video stream and multiple depth frames corresponding to the multiple video frames;
    generating, using the at least one processor, multiple blur kernel maps based on the multiple depth frames;
    reducing, using the at least one processor, depth errors in each of the multiple blur kernel maps;
    performing, using the at least one processor, temporal smoothing on the multiple blur kernel maps to suppress temporal artifacts between different ones of the multiple blur kernel maps; and
    generating, using the at least one processor, blur effects in the video stream using the multiple blur kernel maps.

2. The method of claim 1, wherein generating the multiple blur kernel maps based on the multiple depth frames comprises:
    determining multiple key frames among the multiple video frames based on a user input, wherein each key frame is associated with a focus distance;
    determining focus distances for the multiple video frames based on the focus distance of each key frame; and
    generating each blur kernel map using a corresponding one of the multiple depth frames and a corresponding one of the focus distances.

3. The method of claim 1, wherein reducing the depth errors in each of the multiple blur kernel maps comprises, for each blur kernel map:
    determining a motion boundary mask for the blur kernel map; and
    applying a bilateral filter on one or more regions of the blur kernel map defined by the motion boundary mask.

4. The method of claim 1, wherein performing the temporal smoothing on the multiple blur kernel maps comprises, for each blur kernel map:
    obtaining kernel values for multiple pixels across the blur kernel map and corresponding pixels across multiple previous blur kernel maps in a sequence;
    determining a filtered value for at least some of the kernel values using low-pass filtering; and replacing the at least some kernel values with the filtered values.

5. The method of claim 4, wherein the multiple pixels across the blur kernel map comprise pixels within a motion boundary mask for the blur kernel map.

6. The method of claim 1, wherein generating the blur effects in the video stream using the multiple blur kernel maps comprises, for each video frame in the video stream:
   generating an out-of-focus layer for the video frame using a corresponding one of the blur kernel maps;
   upsampling the out-of-focus layer to a resolution of the video frame; and
   performing an alpha blending operation on the video frame using the out-of-focus layer and an alpha blending map.

7. The method of claim 6, wherein the alpha blending map is generated by:
   upsampling the blur kernel map to a resolution of the video frame; and
   generating the alpha blending map using the upsampled blur kernel map.

8. An electronic device comprising:
   at least one memory configured to store instructions; and
   at least one processing device configured when executing the instructions to:
      obtain multiple video frames of a video stream and multiple depth frames corresponding to the multiple video frames;
      generate multiple blur kernel maps based on the multiple depth frames;
      reduce depth errors in each of the multiple blur kernel maps;
      perform temporal smoothing on the multiple blur kernel maps to suppress temporal artifacts between different ones of the multiple blur kernel maps; and
      generate blur effects in the video stream using the multiple blur kernel maps.

9. The electronic device of claim 8, wherein, to generate the multiple blur kernel maps based on the multiple depth frames, the at least one processing device is configured to:
   determine multiple key frames among the multiple video frames based on a user input, wherein each key frame is associated with a focus distance;
   determine focus distances for the multiple video frames based on the focus distance of each key frame; and
   generate each blur kernel map using a corresponding one of the multiple depth frames and a corresponding one of the focus distances.

10. The electronic device of claim 8, wherein, to reduce the depth errors in each of the multiple blur kernel maps, the at least one processing device is configured, for each blur kernel map, to:
   determine a motion boundary mask for the blur kernel map; and
   apply a bilateral filter on one or more regions of the blur kernel map defined by the motion boundary mask.

11. The electronic device of claim 8, wherein, to perform the temporal smoothing on the multiple blur kernel maps, the at least one processing device is configured, for each blur kernel map, to:
   obtain kernel values for multiple pixels across the blur kernel map and corresponding pixels across multiple previous blur kernel maps in a sequence;
   determine a filtered value for at least some of the kernel values using low-pass filtering; and
   replace the at least some kernel values with the filtered values.

12. The electronic device of claim 11, wherein the multiple pixels across the blur kernel map comprise pixels within a motion boundary mask for the blur kernel map.

13. The electronic device of claim 8, wherein, to generate the blur effects in the video stream using the multiple blur kernel maps, the at least one processing device is configured, for each video frame in the video stream, to:
   generate an out-of-focus layer for the video frame using a corresponding one of the blur kernel maps;
   upsample the out-of-focus layer to a resolution of the video frame; and
   perform an alpha blending operation on the video frame using the out-of-focus layer and an alpha blending map.

14. The electronic device of claim 13, wherein:
   the at least one processing device is further configured to generate the alpha blending map; and
   to generate the alpha blending map, the at least one processing device is configured to:
      upsample the blur kernel map to a resolution of the video frame; and
      generate the alpha blending map using the upsampled blur kernel map.

15. A non-transitory machine-readable medium containing instructions that when executed cause at least one processor of an electronic device to:
   obtain multiple video frames of a video stream and multiple depth frames corresponding to the multiple video frames;
   generate multiple blur kernel maps based on the multiple depth frames;
   reduce depth errors in each of the multiple blur kernel maps;
   perform temporal smoothing on the multiple blur kernel maps to suppress temporal artifacts between different ones of the multiple blur kernel maps; and
   generate blur effects in the video stream using the multiple blur kernel maps.

16. The non-transitory machine-readable medium of claim 15, wherein the instructions that cause the at least one processor to generate the multiple blur kernel maps based on the multiple depth frames comprise instructions that cause the at least one processor to:
   determine multiple key frames among the multiple video frames based on a user input, wherein each key frame is associated with a focus distance;
   determine focus distances for the multiple video frames based on the focus distance of each key frame; and
   generate each blur kernel map using a corresponding one of the multiple depth frames and a corresponding one of the focus distances.

17. The non-transitory machine-readable medium of claim 15, wherein the instructions that cause the at least one processor to reduce the depth errors in each of the multiple blur kernel maps comprise instructions that cause the at least one processor, for each blur kernel map, to:
   determine a motion boundary mask for the blur kernel map; and
   apply a bilateral filter on one or more regions of the blur kernel map defined by the motion boundary mask.

18. The non-transitory machine-readable medium of claim 15, wherein the instructions that cause the at least one processor to perform the temporal smoothing on the multiple blur kernel maps comprise instructions that cause the at least one processor, for each blur kernel map, to:
   obtain kernel values for multiple pixels across the blur kernel map and corresponding pixels across multiple previous blur kernel maps in a sequence;

determine a filtered value for at least some of the kernel values using low-pass filtering; and replace the at least some kernel values with the filtered values.

19. The non-transitory machine-readable medium of claim 18, wherein the multiple pixels across the blur kernel map comprise pixels within a motion boundary mask for the blur kernel map.

20. The non-transitory machine-readable medium of claim 15, wherein the instructions that cause the at least one processor to generate the blur effects in the video stream using the multiple blur kernel maps comprise instructions that cause the at least one processor, for each video frame in the video stream, to:

generate an out-of-focus layer for the video frame using a corresponding one of the blur kernel maps;

upsample the out-of-focus layer to a resolution of the video frame; and perform an alpha blending operation on the video frame using the out-of-focus layer and an alpha blending map.

* * * * *